United States Patent [19]

Kanda et al.

[11] Patent Number: 4,700,665
[45] Date of Patent: Oct. 20, 1987

[54] CYLINDER HEAD WITH COOLANT PASSAGE PASSING AROUND OUTSIDE OF CYLINDER HEAD FIXING BOLT BOSS AND DIRECTING COOLANT FLOW TOWARD SQUISH AREA COOLING PASSAGE PORTION

[75] Inventors: Mutsumi Kanda; Takeshi Okumura; Yoshihiro Iwashita, all of Toyota, Japan

[73] Assignee: Toyota Jidosha Kabushiki Kaisha, Aichi, Japan

[21] Appl. No.: 883,036

[22] Filed: Jul. 8, 1986

[30] Foreign Application Priority Data

Jul. 10, 1985 [JP] Japan .................................. 60-151615

[51] Int. Cl.⁴ ................................................. F01P 3/02
[52] U.S. Cl. ............................ 123/41.82 R; 123/193 H
[58] Field of Search ................ 123/41.74, 41.76, 41.77, 123/41.79, 41.82 R, 193 H

[56] References Cited

U.S. PATENT DOCUMENTS

| | | | |
|---|---|---|---|
| 4,436,061 | 3/1984 | Hayashi | 123/41.82 R |
| 4,455,973 | 6/1984 | Stadler et al. | 123/41.82 R |
| 4,471,726 | 9/1984 | Seidl | 123/41.82 R |
| 4,567,859 | 2/1986 | Taguchi et al. | 123/41.82 R |

Primary Examiner—William A. Cuchlinski, Jr.
Attorney, Agent, or Firm—Kenyon & Kenyon

[57] ABSTRACT

An internal combustion engine has a cylinder block formed with first and second cylinder bores, and first and second pistons are fitted in the bores and reciprocate in them. A cylinder head is affixed to the cylinder block and defines first and second combustion chambers in cooperation with the first and second pistons and cylinder bores. This cylinder head is formed with a portion which in cooperation with a portion of the first piston defines a squish area of the first combustion chamber, with a cylinder fixing bolt hole boss being located between the first portion and the second portion of the cylinder head, and being disposed towards the side of the cylinder head on the side of the squish area. Further, the cylinder head is formed with a side wall defining one side of a coolant passage which substantially follows through the cylinder head proximate to the squish area so that a first portion of the coolant passage directly cools the squish area. A second portion of the coolant passage passes around the boss at least between it and the side wall of the cylinder head, and directs flow of coolant through it to the first coolant passage portion. Optionally, this second coolant passage portion may also pass around the other side of the boss.

11 Claims, 2 Drawing Figures

CYLINDER HEAD WITH COOLANT PASSAGE PASSING AROUND OUTSIDE OF CYLINDER HEAD FIXING BOLT BOSS AND DIRECTING COOLANT FLOW TOWARD SQUISH AREA COOLING PASSAGE PORTION

BACKGROUND OF THE INVENTION

The present invention relates to a cylinder head for an internal combustion engine for a vehicle such as an automobile, and more particularly relates to such a cylinder head, the construction of which incorporates a coolant passage for cooling a squish area defined between the cylinder head and a cylinder piston, in which the configuration of said coolant passage is improved for improving the cooling effect provided for said squish area.

An internal combustion engine for a vehicle such as an automobile is often liquid cooled, and in such a case the cylinder head thereof is typically formed with various passages for coolant flow, circulation of liquid coolant such as water through which is effective for cooling said cylinder head and also for cooling a cylinder block of the engine. Such a coolant passage is typically formed to run around a part of the periphery of the portion of the cylinder head which defines the roof of a combustion chamber thereof. And, in general, it is known that the configuration of such coolant passages in the cylinder head has a great effect upon the mechanical octane value of the internal combustion engine as a whole.

In order to maintain this mechanical octane value of the internal combustion engine at a desirably high level, it is required to construct the coolant passage so that flow of coolant through it effectively cools the portion of the cylinder head which defines the roof of the combustion chamber, andin particular good cooling should be provided to those portions of the combustion chamber roof which define knocking points, such as the end gas area and any squish areas which are defined in the combustion chamber in cooperation with the piston for said combustion chamber, because such an end gas area and such a squish area are particularly likely to become knocking points. Therefore, it is desirable to so arrange the coolant passage as to well cool such a squish area, and in Japanese Patent Application Ser. No. Sho. 58-35221 (1983), which it is not intended hereby to admit as prior art to the present patent application except to the extent otherwise required by applicable law, there is disclosed a cylinder head construction which gives particularly powerful cooling to such a squish area, in order to maintain the mechanical octane value of the internal combustion engine at a desirably high level.

Now such a coolant passage which cools the squish area is typically a so called port lower coolant passage which extends between an intake port or an exhaust port formed in the cylinder head and said combustion chamber roof defining portion of said cylinder head. Nowadays there is a continuing drive for making internal combustion engines as compact as possible, and particularly the space available in the cylinder head is becoming more and more crowded. This is particularly the case for internal combustion engines which are provided with more than two valves for each of their combustion chambers, such as so called four valve engines. In the construction of such a cylinder head, the space available for forming bosses for defining cylinder head fixing bolt holes, through which are passed the cylinder head fixing bolts which secure the cylinder head to the cylinder block of the internal combustion engine, becomes rather restricted, and a convenient point to locate said cylinder head fixing bolt bosses is at positions along the cylinder head, in the longitudinal direction of the cylinders, between each cylinder and its neighbor. In such a configuration, it becomes difficult to prevent these cylinder head fixing bolt bosses from obstructing either the inlet of such a squish area cooling port lower coolant passage or the outlet thereof, and quite often in fact both said inlet and said outlet of said coolant passage are obstructed. In such a case, the middle portion of said squish area cooling port lower coolant passage, which is the portion actually adjacent to said squish area which cools said squish area, has a substantially larger cross sectional area than do the inlet and outlet of said passage, and this means that a sufficient flow speed for coolant through this middle passage portion may not be attained. Further, eddies or stagnant areas may be produced in the flow in said middle passage portion, and as a result the effectiveness of the cooling provided for the squish area can in some cases not be sufficient.

SUMMARY OF THE INVENTION

Accordingly, it is the primary object of the present invention to provide a internal combustion engine cylinder head for an internal combustion engine, which avoids the above described problems.

It is a further object of the present invention to provide an internal combustion engine cylinder head, which provides good cooling for a squish area defined in a combustion chamber of the engine.

It is a further object of the present invention to provide such a cylinder head, which maintains the mechanical octane value of the engine high.

It is a yet further object of the present invention to provide such a cylinder head, which particularly provides good cooling for a portion or portions of the cylinder head that are prone to be knocking spots thereof.

It is a yet further object of the present invention to provide such a cylinder head, which militates to prevent knocking of the engine.

It is a yet further object of the present invention to provide such a cylinder head, formed with such a coolant passage, which maintains good coolant flow in said coolant passage.

It is a yet further object of the present invention to provide such a cylinder head, formed with such a coolant passage, which helps to prevent the generation of any stagnant portions or eddies in said coolant passage.

It is a yet further object of the present invention to provide such a cylinder head, formed with such a coolant passage, which helps to prevent the generation of stagnant spots at portions of said coolant passage where the flow speed therein is relatively low.

According to the most general aspect of the present invention, these and other objects are accomplished by, for an internal combustion engine of an automotive vehicle, comprising a cylinder block formed with a first cylinder bore and a second cylinder bore, and first and second pistons respectively fitted in said first cylinder bore and said second cylinder bore and reciprocating therein: a cylinder head for affixment to said cylinder block and for defining a first combustion chamber and a second combustion chamber by first and second portions of said cylinder head in cooperation respectively with said first piston and said first cylinder bore, and said second piston and said second cylinder bore, formed with: (a) a portion which in cooperation with a portion of said first piston defines a squish area of said first combustion chamber; (b) a cylinder fixing bolt hole boss between said first portion of said cylinder head which defines said first combustion chamber and said second portion ofsaid cylinder head which defines said second combustion chamber and disposed towards the side of said cylinder head on the side of said squish area; (c) a side wall defining one side of a coolant passage which substantially follows through said cylinder head proximate to said squish area so that a first portion of said coolant passage directly cools said squish area; (d) a second portion of said coolant passage passing around said cylinder fixing bolt hole boss at least between it and said side wall of said cylinder head; (e) said second coolant passage portion directing flow of coolant therethrough to said first coolant passage portion.

According to the present invention as described above, the coolant flows well through this first portion of this coolant passage which directly cools the squish area, because it is directed thereto by the second coolant passage portion; and the coolant flow speed does not decrease at said squish area cooling portion, nor does the coolant flow develop eddies or stagnate at this point. Accordingly, the squish area is well and effectively cooled by this portion of the coolant passage, and thus the prevention of knocking at the squish area of the combustion chamber is effectively assured, and the mechanical octane value of the engine is maintained as high.

Further, according to certain particular specializations of the principle of the present invention, the above objects may be more particularly accomplished by a cylinder head as defined above, wherein the inner wall of said coolant passage bulges inwards towards the central axis of said cylinder bore to follow an inward bulging of said squish area. Also, advantageously, said second portion of said coolant passage may also pass around the other side of said cylinder fixing bolt hole boss, which makes the coolant flow less restricted by said boss. Such constructions serve well for further advancing the objects of the present invention.

BRIEF DESCRIPTION OF THE DRAWINGS

The present invention will now be shown and described with regard to the preferred embodiment thereof, and with reference to the illustrative drawings, which however should not be considered as limitative of the present invention in any way, since the scope of the present invention is to be considered as being delimited solely by the accompanying claims, rather than by any particular features of the disclosed embodiment or of the drawings. In these drawings:

DESCRIPTION OF THE PREFERRED EMBODIMENT

Figure 1:
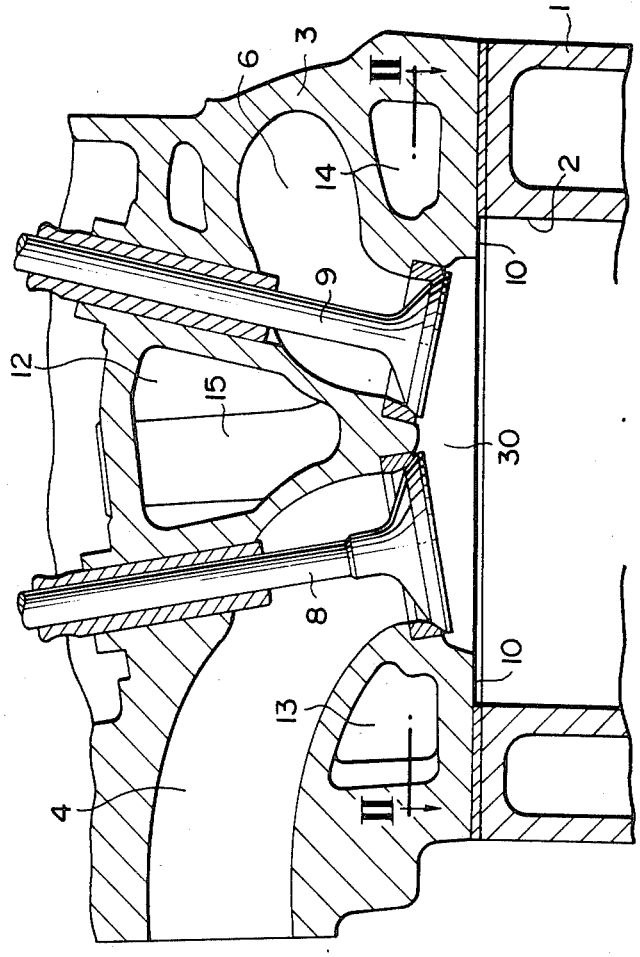
FIG. 1 is a partial sectional view of a cylinder block and a cylinder head of an internal combustion engine, and of a combustion chamber defined therebetween, taken in a plane including the central longitudinal axis of one of several cylinder bores of said cylinder block and perpendicular to the longitudinal direction of said cylinder block along the line of said several cylinders thereof, said cylinder head being the preferred embodiment of the present invention.

The present invention will now be described with reference to the preferred embodiment thereof. FIG. 1 is a sectional view of an internal combustion engine which comprises a cylinder block denoted by the reference numeral 1 and a cylinder head, which is the preferred embodiment of the cylinder head of the present invention, denoted by the reference numeral 3. The cylinder block 1 is formed with a cylinder bore 2, and FIG. 1 is taken in a plane including the central longitudinal axis of said cylinder bore 2, transverse to the longitudinal line in which the cylinders of the engine lie. In this cylinder bore 2 there reciprocates a piston, not particularly shown in the drawings, and between said piston, said cylinder head 3, and the upper portion of said cylinder bore 2 there is defined a combustion chamber 30 for this piston and cylinder. The arrangements for the other cylinders of this internal combustion engine are similar. And the fixing of the cylinder head 3 to the cylinder block 1 is done by the use of cylinder head fixing bolts, not particularly shown, fitted through cylinder head fixing bolt holes 16 formed in bosses 17 formed in the cylinder head 3 between each pair of adjacent cylinders, as particularly shown in the FIG. 2 view. In this preferred embodiment, these cylinder head fixing bolt bosses 17 are substantially circular in cross section.

Figure 2:
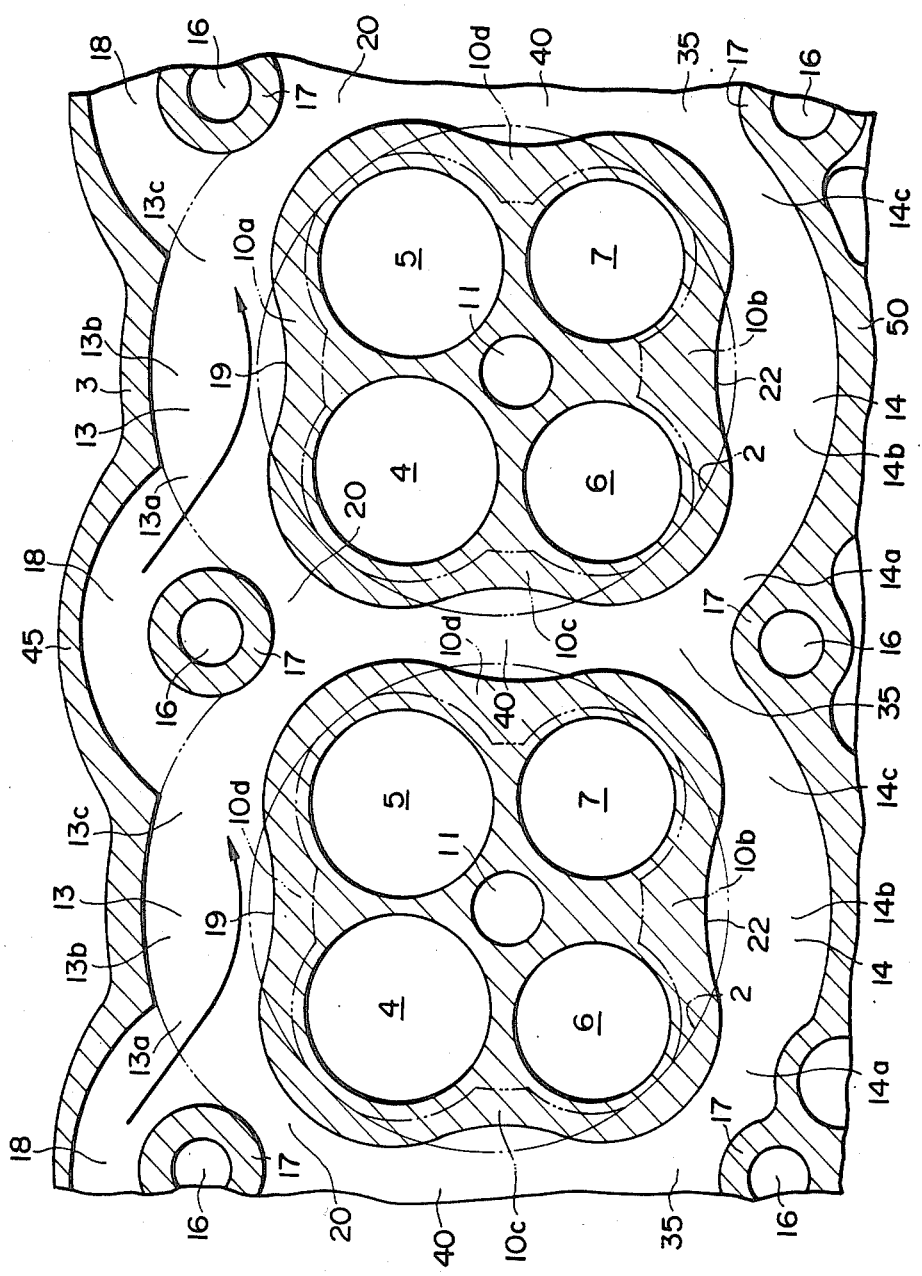
FIG. 2 is a partial transverse sectional view of a portion of said cylinder head taken in a plane shown by the arrows II—II in FIG. 1 and showing the cylinder head portions corresponding to two adjacent cylinders.

The cylinder head 3 is formed with two intake ports 4 and 5 and two exhaust ports 6 and 7 for each of the cylinders, all of which open via respective valve seats to the combustion chamber 30 for their cylinder, with the centers of said valve seats for each cylinder approximately at the corners of a square, as generally shown in FIG. 2. Thus, this internal combustion engine is of the four valve type. And the intake ports 4 and 5 for the various cylinders of this engine are all arranged on the one side of the cylinder block 1 and the cylinder head 3, in the longitudinal direction of said cylinder head 3 along the row of cylinders thereof, which corresponds to the direction perpendicular to the drawing paper in FIG. 1 and to the horizontal direction in FIG. 2; and, similarly, the exhaust ports 6 and 7 for the various cylinders are all arranged on the other side to said one side of the cylinder block 1 and the cylinder head 3, again in the horizontal direction of said cylinder head 3 as seen in FIG. 2 along the row of cylinders thereof. Poppet valves 8 (of which only one can be seen in the sectional view of FIG. 1) of a per se known type, mounted in per se known valve guides fitted in the cylinder head 3, are provided for cooperating with intake valve seats inset around the edges of each of the intake ports 4 and 5, so as to open/close control communication between said intake ports 4 and 5 and the combustion chamber 30; and two other poppet valves 9, also per se known and mounted in per se known valve guides fitted in the cylinder head 3, and again only one of which can be seen in FIG. 1, are provided for similarly cooperating with exhaust valve seats inset around the edges of the exhaust ports 6 and 7, so as similarly to open/close control the communication between said exhaust ports 6 and 7 and said combustion chamber 30. And by actuation of these intake poppet valves 8 and exhaust poppet valves 9 by per se known valve gear not particularly shown, the internal combustion engine is caused to operate according to an Otto cycle so as to generate rotational power.

As best seen in FIG. 2, substantially in the middle of the portion of the cylinder head 3 defining the roof of each of the combustion chambers 30 there is formed a screwed hole 11 for fitting a spark plug (not particularly shown in the drawings) thereinto. And, for each said combustion chamber 30, said portion of the cylinder head 3 defining said roof of said combustion chamber 30 and the engine piston (nor particularly shown) are so formed as to define between them squish areas as follows: between the two intake ports 4 and 5 there is defined, as bulging inward fromt the circular periphery of the combustion chamber 30 defined by the cylinder bore 2, an intake port side squish area 10a; between the two exhaust ports 6 and 7 there is defined, also as bulging inward from said circular periphery of the combustion chamber 30, an exhaust port side squish area 10b; between the intake port 4 and the exhaust port 6 there is defined as bulging inward from said circular periphery of the combustion chamber 30 a first intake - exhaust side squish area 10c; and between the other intake port 5 and the other exhaust port 7 there is defined as bulging inward from said circular periphery of the combustion chamber 30 a second intake - exhaust side squish area 10d. Thus, as will be appreciated from consideration of FIG. 2, the non squish area defining portion of the combustion chamber 30 extends generally in four rings each of substantially uniform width around the peripheries of each of the valve seats of the intake and exhaust valves 4 through 7, said four rings being connected by a central portion.

Through the cylinder head 3 there is formed a system of coolant passages for admitting flow of a coolant such as water for cooling said cylinder head 3 and the cylinder block 1, said coolant passages extending generally in the direction perpendicular to the drawing paper in FIG. 1 and in the horizontal direction as seen in FIG. 2, generally along the line of the cylinders of the internal combustion engine. This system of coolant passages includes a main coolant passage 12 which passes, for each cylinder, between the intake port 4 and the exhaust port 6, around the defining wall portions of the screwed spark plug hole 11, and between the intake port 5 and the exhaust port 7, which is not particularly relevant to the present invention; an intake port side lower coolant passage 13 which passes, for each cylinder, between the intake ports 4 and 5 and the lower surface of the cylinder head 3 which defines the intake port side squish area 10a, the configuration of this intake port side lower coolant passage 13 incorporating the particular distinguishing feature of this preferred embodiment of the cylinder head of the present invention; and an exhaust port side lower coolant passage 14 which passes, for each cylinder, between the exhaust ports 6 and 7 and the lower surface of the cylinder head 3 which defines the exhaust port side squish area 10b, the configuration of this exhaust port side lower coolant passage 14 specifically not incorporating said particular distinguishing feature of the present invention.

In detail, as shown in the sectional view of FIG. 2, with regard to each of the portions of the intake port side lower coolant passage 13 which extend along and beside each of those portions of the cylinder head 3 which define the roofs of the combustion chambers 30, which may be defined as having an inlet portion 13a, a middle portion 13b, and an outlet portion 13c, its side wall on the side towards the central axis of each of the cylinder bores 2 is bent inwards in a curved portion 19 towards the inward side defining line of the intake port side squish area 10a, so that said intake port side squish area 10a is at least partially directly cooled by the coolant flowing through said intake port side lower coolant passage 13; and, similarly, with regard to each of the portions of the exhaust port side lower coolant passage 14 which extend along and beside each of said portions of the cylinder head 3 which define the roofs of the combustion chambers 30, which may be defined as having an inlet portion 14a, a middle portion 14b, and an outlet portion 14c, its side wall on the side towards the central axis of each of the cylinder bores 2 is likewise bent inwards in a curved portion 22 towards the inward side defining line of the exhaust port side squish area 10b, so that said exhaust port side squish area 10b is at least partially directly cooled by the coolant flowing through said exhaust port side lower coolant passage 14. Further, in addition to this construction, with regard to said intake port side lower coolant passage 13, the outlet portion 13c of one of said portions thereof is connected to the inlet portion 13a of the next one of said portions thereof for the next adjoining cylinder in the following way: the boss 17 for the cylinder head fixing bolt (not shown) on this intake valve side between these two cylinders is formed as isolated from the side wall 45 on this intake valve side of the cylinder head, so that a passage 18 is defined on the outside of said boss 17 between it and said side wall 45, as well as a passage 20 being defined on the inside of said boss 17 between it and the portions of the cylinder head which define the intake valves 4 and 5 of the neighboring cylinders; and both these outer and inner passages 18 and 20, in parallel, join the outlet portion 13c of one of said portions of the intake port side lower coolant passage 13 to the inlet portion 13a of the next one thereof for the next adjoining cylinder. However, this constructional concept is not practiced with regard to the exhaust port side lower coolant passage 14, although in another possible embodiment of the cylinder head according to the present invention it well could be; but on the contrary the bosses 17 for the cylinder head fixing bolts (not shown) on this exhaust valve side between each adjoining two cylinders are formed as meeting with and integral with the side wall 45 on this exhaust valve side of the cylinder head, so that only a passage 35 is defined on the inside of said boss 17 between it and the portions of the cylinder head which define the exhaust valves 7 and 6 of the neighboring cylinders; and only this these inner passages 35, alone, joins the outlet portion 14c of one of said portions of the exhaust port side lower coolant passage 14 to the inlet portion 14a of the next one thereof for the next adjoining cylinder.

According to this construction on the intake port side, the following beneficial effect is obtained. Since the outer connecting passage portions 18 are provided extending around the outer sides of the bosses 17 for the cylinder head fixing bolt holes 16, in addition to the inner connecting passage portions 20 on the inner sides of said bosses 17, the amount of flow of coolant through the intake port side lower coolant passage 13 is increased as compared to what it would be if no such outer connecting passage portions 18 were provided, which in itself greatly improves the cooling of the intake port side squish area 10a by this increased coolant amount flowing through said intake port side lower coolant passage 13. Further, since said outer connecting passage portions 18 extend arcuately around each of the cylinder head fixing bolt bosses 17, thereby the flow of coolant through said intake port side lower coolant passage 13 through the inlet portions 13a thereof into the central portions 13b is preferentially directed inwards so as to impinge well against the side walls of said central portions 13b on their side towards the central axis of each of the cylinder bores 2, i.e. against the inwardly bent curved portions 19 of said inner side walls, as shown by the arrow in FIG. 2. This causes particularly good cooling of the intake port side squish area 10a located between the two intake ports 4 and 5 of each of the combustion chambers 30, which squish areas 10a might otherwise tend to become knocking areas in said combustion chambers 30. Thereby, the likelihood of the occurrence of knocking of the engine is significantly reduced, and accordingly the mechanical octane value of the engine is increased.

On the other hand, considering the case of the exhaust port side lower coolant passage 14 to illustrate the disadvantages entailed when the inventive concept of the present invention is not practiced, since only the passages 35 are defined on the inside of the bosses 17 between them and the portions of the cylinder head which define the exhaust valves 7 and 6 of the neighboring cylinders, the flow of coolant through said exhaust port side lower coolant passage 14 is thereby rather restricted, since the passages 35 are inevitably restricted owing to the requirement for making the bosses 17 considerably fat in order to accomodate the cylinder head fixing bolts (not particularly shown) fitted in the cylinder head fixing bolt holes 16, and also in order to provide sufficient structural strength for these parts of the cylinder head 3 which are those parts that must bear the strain of the fixing of said cylinder head 3 to the cylinder block 1 by the cylinder head fixing bolts. Further, the flow of coolant through these restricted passage portions 35 and through the inlet portions 14a of the exhaust port side lower coolant passage 14 is not particularly directed at the inner wall curved portions 22 proximate to the exhaust port side squish area 10b located between the two exhaust ports 6 and 7 of the combustion chamber 30, and accordingly the cooling of said exhaust port side squish area 10b by said exhaust port side lower coolant passage 14 is relatively poor. Thereby, the likelihood of the occurrence of knocking of the engine, as far as this point therein is concerned, is not reduced. Accordingly, although it is not so performed in this preferred embodiment, it is considered that it might be desirable in some circumstances to practice the construction of the present invention with regard to this exhaust port side lower coolant passage 14 also, depending however upon circumstances.

In fact, in the shown preferred embodiment, the inner connecting passage portions 20 which constitute portions of the intake port side lower coolant passage 13 are connected via passage portions 40 to the passages 35 defined on the inside of the bosses 17 which constitute portions of the exhaust port side lower coolant passage 14, but this is not particularly relevant to the principle of the present invention.

Although the present invention has been shown and described in terms of the preferred embodiment thereof, and with reference to the appended drawings, it should not be considered as being particularly limited thereby. The details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiment, or of the drawings, but solely by the legitimate and properly interpreted scope of the accompanying claims, which follow.

What is claimed is:

1. For an internal combustion engine of an automotive vehicle, comprising a cylinder block formed with a first cylinder bore and a second cylinder bore, and first and second pistons respectively fitted in said first cylinder bore and said second cylinder bore and reciprocating therein:
  a cylinder head for affixment to said cylinder block and for defining a first combustion chamber and a second combustion chamber by first and second portions of said cylinder head in cooperation respectively with said first piston and said first cylinder bore, and said second piston and said second cylinder bore, formed with:
  (a) a portion which in cooperation with a portion of said first piston defines a squish area of said first combustion chamber;
  (b) a cylinder fixing bolt hole boss between said first portion of said cylinder head which defines said first combustion chamber and said second portion of said cylinder head which defines said second combustion chamber and disposed towards the side of said cylinder head on the side of said squish area;
  (c) a side wall defining one side of a coolant passage which substantially follows through said cylinder head proximate to said squish area so that a first portion of said coolant passage directly cools said squish area;
  (d) a second portion of said coolant passage passing around said cylinder fixing bolt hole boss at least between it and said side wall of said cylinder head;
  (e) said second coolant passage portion directing flow of coolant therethrough to said first coolant passage portion.

2. A cylinder head according to claim 1, wherein said squish area is defined between a pair of ports formed in said cylinder head.

3. A cylinder head according to claim 1, wherein said squish area bulges inwards towards the central axis of said cylinder bore.

4. A cylinder head according to claim 2, wherein said squish area bulges inwards towards the central axis of said cylinder bore between said two ports.

5. A cylinder head according to claim 3, wherein the inner wall of said coolant passage bulges inwards towards the central axis of said cylinder bore to follow said inward bulging of said squish area.

6. A cylinder head according to claim 4, wherein the inner wall of said coolant passage bulges inwards towards the central axis of said cylinder bore between said two ports to follow said inward bulging of said squish area.

7. A cylinder head according to claim 5, wherein said second portion of said coolant passage also passes around the other side of said cylinder fixing bolt hole boss.

8. A cylinder head according to claim 6, wherein said second portion of said coolant passage also passes around the other side of said cylinder fixing bolt hole boss.

9. A cylinder head according to any one of claims 2, 4, 6, and 8, wherein said two ports formed in said cylinder head are intake ports.

10. A cylinder head according to any one of claims 1 through 8, wherein said cylinder fixing bolt hole boss is substantially circular in cross section.

11. A cylinder head according to claim 9, wherein said cylinder fixing bolt hole boss is substantially circular in cross section.

* * * * *